United States Patent
Henry

(10) Patent No.: US 10,602,653 B2
(45) Date of Patent: Mar. 31, 2020

(54) SYSTEM AND METHOD FOR CONTROLLING THE ORIENTATION OF GROUND ENGAGING ELEMENTS ON AN AGRICULTURAL IMPLEMENT

(71) Applicant: CNH Industrial Canada, Ltd., Saskatoon (CA)

(72) Inventor: James W. Henry, Saskatchewan (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 217 days.

(21) Appl. No.: 15/792,884

(22) Filed: Oct. 25, 2017

(65) Prior Publication Data
US 2019/0116716 A1 Apr. 25, 2019

(51) Int. Cl.
| | | |
|---|---|---|
| A01B 63/00 | (2006.01) |
| A01B 21/08 | (2006.01) |
| A01B 73/00 | (2006.01) |
| A01B 63/10 | (2006.01) |
| A01B 63/22 | (2006.01) |
| A01B 49/02 | (2006.01) |
| A01B 21/04 | (2006.01) |

(52) U.S. Cl.
CPC .......... *A01B 63/008* (2013.01); *A01B 21/04* (2013.01); *A01B 21/08* (2013.01); *A01B 49/027* (2013.01); *A01B 63/10* (2013.01); *A01B 63/22* (2013.01); *A01B 73/00* (2013.01)

(58) Field of Classification Search
CPC ...... A01B 21/00–086; A01B 19/00–10; A01B 23/04; A01B 49/027; A01B 63/008; A01B 63/10; A01B 63/22; A01B 73/00–067
See application file for complete search history.

(56) References Cited

U.S. PATENT DOCUMENTS

| | | |
|---|---|---|
| 3,912,018 A | 10/1975 | Brundage et al. |
| 5,042,589 A | 8/1991 | Hundeby et al. |
| 5,251,704 A | 10/1993 | Bourgault et al. |

(Continued)

FOREIGN PATENT DOCUMENTS

WO  WO 2013/036191  3/2013

*Primary Examiner* — Robert E Pezzuto
*Assistant Examiner* — Adam J Behrens
(74) *Attorney, Agent, or Firm* — Rebecca L. Henkel; Rickard K. DeMille

(57) ABSTRACT

A method for controlling an orientation of ground engaging elements of a harrow of an agricultural implement may include controlling an operation of an actuator such that the actuator applies an actuator force against a support arm when the harrow is disposed at an operating position. The method may also include receiving an input indicative of an instruction to move the harrow from the operating position to a raised position. Furthermore, after receiving the input, the method may include controlling the operation of the actuator such that the actuator force applied against the support arm is adjusted in a manner that reduces the biasing force being applied on the ground engaging elements. Additionally, the method may include initiating movement of the harrow from the operating position to the raised position to raise the ground engaging elements above the ground after reducing the biasing force.

20 Claims, 6 Drawing Sheets

(56) References Cited

U.S. PATENT DOCUMENTS

| | | | |
|---|---|---|---|
| 5,492,182 A * | 2/1996 | Delaurier | A01B 19/02 172/615 |
| 5,769,170 A | 6/1998 | Skjaeveland | |
| 6,144,910 A | 11/2000 | Scarlett et al. | |
| 6,164,386 A * | 12/2000 | Delaurier | A01B 19/02 172/615 |
| 6,192,993 B1 | 2/2001 | Flenker et al. | |
| 6,263,977 B1 | 7/2001 | Mayerie et al. | |
| 6,305,478 B1 | 10/2001 | Friggstad | |
| 6,318,477 B1 | 11/2001 | Bettin | |
| 6,896,068 B2 | 5/2005 | Dietrich, Sr. et al. | |
| 7,673,570 B1 | 3/2010 | Bassett | |
| 7,686,095 B2 | 3/2010 | Batthala et al. | |
| 8,657,026 B2 * | 2/2014 | Friesen | A01B 63/32 172/452 |
| 8,868,303 B2 | 10/2014 | Tuttle et al. | |
| 8,909,435 B2 | 12/2014 | Tuttle et al. | |
| 8,914,198 B2 | 12/2014 | Prickel et al. | |
| 9,086,699 B2 | 7/2015 | Pirotais | |
| 9,114,822 B2 | 8/2015 | Prickel et al. | |
| 9,232,687 B2 | 1/2016 | Bassett | |
| 9,307,689 B2 | 4/2016 | Adams et al. | |
| 10,045,475 B2 * | 8/2018 | Steinlage | A01B 63/245 |
| 10,299,421 B2 * | 5/2019 | Lung | A01B 19/10 |
| 10,327,373 B2 * | 6/2019 | Steinlage | A01B 61/046 |
| 2012/0261146 A1 | 10/2012 | Bolten | |
| 2013/0341056 A1 * | 12/2013 | Casper | A01B 63/111 172/4 |
| 2014/0311814 A1 | 10/2014 | Morselli et al. | |
| 2016/0234994 A1 * | 8/2016 | Gray | A01B 63/24 |
| 2017/0079190 A1 * | 3/2017 | Steinlage | A01B 61/046 |
| 2017/0079197 A1 * | 3/2017 | Steinlage | A01B 73/044 |
| 2017/0127602 A1 * | 5/2017 | Paulessen | A01B 63/24 |

* cited by examiner

SYSTEM AND METHOD FOR CONTROLLING THE ORIENTATION OF GROUND ENGAGING ELEMENTS ON AN AGRICULTURAL IMPLEMENT

FIELD

The present disclosure generally relates to agricultural implements and, more particularly, to systems and methods for controlling the orientation of ground engaging elements on a harrow of an agricultural implement when adjusting the position of the harrow relative to the ground.

BACKGROUND

A wide variety of agricultural implements may be used to prepare soil for planting. One such implement is a harrow. As is generally known, harrows may be configured to be towed behind a work vehicle, such as tractor, to level soil after it has been tilled by, e.g., a cultivator. Level soil promotes uniform planting depth and uniform germination. More specifically, harrows typically include a plurality of ground engaging elements, such as tines or spikes, which extend downward from a frame of the harrow. These ground engaging elements may be configured to contact and engage the soil. As such, a bias force exerted on the ground engaging elements maintains the contact between ground engaging elements and the soil as the harrow is towed across a field.

When the harrow reaches an area of the field in which no tilling is necessary (e.g., a headlands), the harrow is generally raised such that the ground engaging elements are lifted out of the soil. Once the harrow returns to an area of the field in which tilling is required, the harrow is lowered back into an operating position in which the ground engaging elements contact the soil. For example, the harrow may be lifted out the soil when the harrow reaches the end of a row of the field and then lowered back down into the operating position when the harrow begins traversing a new row. However, the bias force exerted on ground engaging elements while the harrow is raised above the ground causes the ground engaging elements to move into a vertical orientation. Such a vertical orientation makes it difficult for the ground engaging elements to reengage the soil when the harrow is lowered back into the operating position.

Accordingly, an improved system and method for controlling an orientation of the ground engaging elements of a harrow of an agricultural implement when adjusting the position of the harrow relative to the ground would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a method for controlling an orientation of ground engaging elements of a harrow of an agricultural implement when adjusting the position of the harrow relative to the ground. The harrow may include a support arm configured to support the ground engaging elements relative to the ground. The method may include controlling, with a computing device, an operation of an actuator coupled to the support arm such that the actuator applies an actuator force against the support arm when the harrow is disposed at an operating position relative to the ground. The actuator force may result in a biasing force being applied on the ground engaging elements that biases the ground engaging elements toward a vertical orientation as the ground engaging elements contact the ground. The method may also include receiving, with the computing device, a first input indicative of an instruction to move the harrow from the operating position to a raised position relative to the ground. Furthermore, after receiving the input, the method may include controlling, with the computing device, the operation of the actuator such that the actuator force applied against the support arm is adjusted in a manner that reduces the biasing force being applied on the ground engaging elements. Additionally, the method may include initiating, with the computing device, movement of the harrow from the operating position to the raised position to raise the ground engaging elements above the ground after reducing the biasing force being applied on the ground engaging elements.

In another aspect, the present subject matter is directed to a system for controlling an orientation of ground engaging elements of a harrow of an agricultural implement when adjusting the position of the harrow relative to the ground. The system may include a support arm, a plurality of ground engaging elements supported on the support arm, and an actuator coupled to the support arm. A controller of the system may be configured to control an operation of the actuator such that actuator applies an actuator force against the support arm when the harrow is disposed at an operating position relative to the ground. The actuator force may result in a biasing force being applied on the ground engaging elements that biases the ground engaging elements toward a vertical orientation as the ground engaging elements contact the ground. The controller may also be configured to receive a first input indicative of an instruction to move the harrow from the operating position to a raised position relative to the ground. After receiving the first input, the controller may be configured to control the operation of the actuator such that the actuator force applied against the support arm is adjusted in a manner that reduces the biasing force being applied on the ground engaging elements. Furthermore, the controller may be configured to initiate movement of the harrow from the operating position to the raised position to raise the ground engaging elements above the ground after reducing the biasing force being applied on the ground engaging elements.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

specification, which makes reference to the appended figures, in which.

Figure 1:
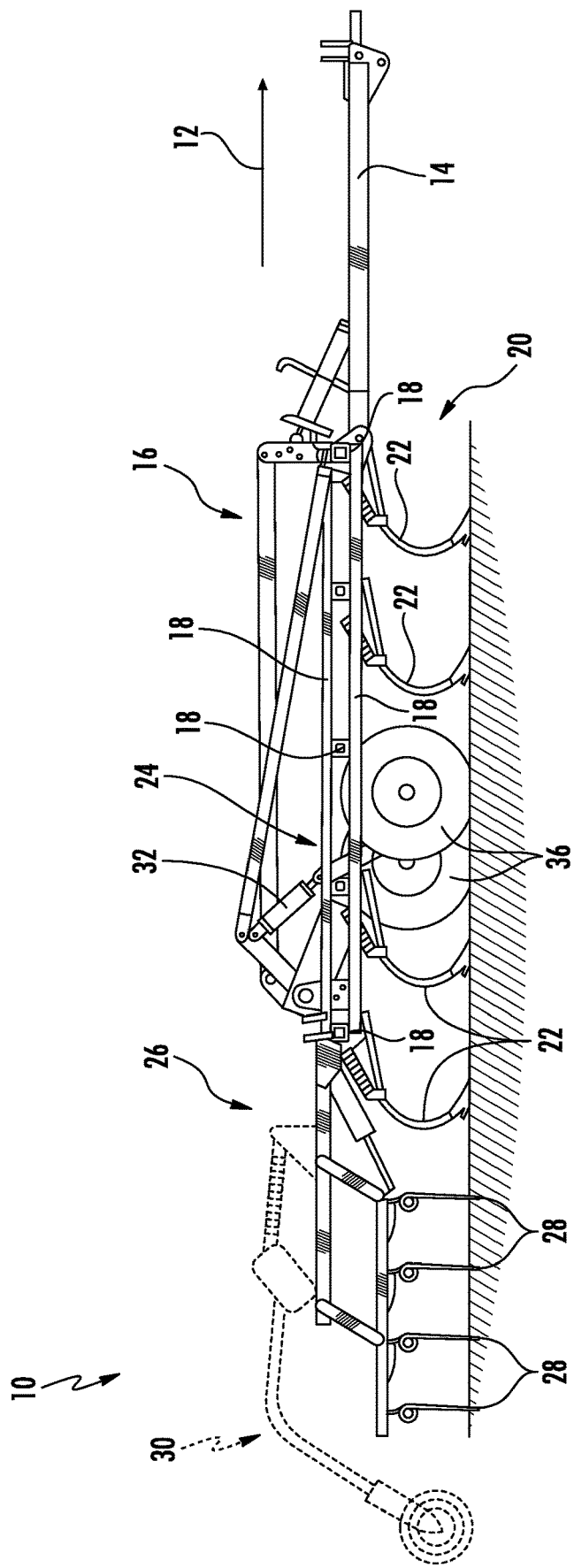
FIG. 1 illustrates a side view of one embodiment of an agricultural implement in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the orientation of ground engaging elements of a harrow of an agricultural implement when adjusting the position of the harrow relative to the ground. Specifically, in several embodiments, when the harrow is disposed at an operating position relative to the ground, a controller of the disclosed system may be configured to control the operation of an actuator coupled to the harrow such that the actuator applies an actuator force against a support arm of the harrow. For instance, the support arm may support a plurality of ground engaging elements configured to engage the soil when the harrow is at the operating position. In this regard, the actuator force exerted on the support arm by the actuator may result in a biasing force being applied on the ground engaging elements that biases the ground engaging elements toward a vertical orientation as the ground engaging elements contact the ground. After receiving an input indicative of an instruction to move the harrow from the operating position to a raised position relative to the ground, the controller may be configured to control the operation of the actuator such that the actuator force applied against the support arm is adjusted in a manner that reduces the biasing force being applied on the ground engaging elements. Once the actuator force applied against the support arm is reduced, the controller may be configured to initiate movement of the harrow from the operating position to the raised position to lift the ground engaging elements above the ground. By reducing the biasing force exerted on the ground engaging elements before moving the harrow to the raised position, the ground-engaging elements remain in a generally non-vertical position or an otherwise angled non-vertical orientation while the harrow is disposed at the raised position. As such, the ground engaging elements are able to more effectively reengage the soil when the harrow is lowered back into the operating position.

Referring now to FIG. 1, a side view of one embodiment of an agricultural implement 10 is illustrated in accordance with aspects of the present subject matter. As shown, the implement 10 may be configured to be towed along a direction of travel 12 by a work vehicle (not shown), such as a tractor or other agricultural work vehicle. For example, the work vehicle may be coupled to the implement 10 via a hitch assembly 14 or using any other suitable attachments means. As shown, the hitch assembly 14 may be coupled to a frame 16 of the implement 10 to facilitate towing the implement 10 in the direction of travel 12.

In general, the implement frame 16 may include a plurality of structural frame members 18, such as beams, bars, and/or the like, configured to support a plurality of components. For instance, as shown in the illustrated embodiment, the frame 16 may be configured to support a cultivator 20, which may be configured to till or otherwise break the soil over which the implement 10 travels. In this respect, the cultivator 20 may include a plurality of cultivator members 22, such as the illustrated shank assemblies, that are pulled through the soil as the implement 10 moves in the direction of travel 12. As shown, the cultivator members 22 may be configured to be pivotally mounted to the implement frame 16 to allow the cultivator members 22 pivot out of the way of rocks or other impediments in the soil. Additionally, one or more wheel assemblies 24 may be coupled to the implement frame 16 that support the weight of the frame 16 and the cultivator 20, thereby enabling the implement 10 to be towed across the field.

Moreover, as shown in FIG. 1, the implement 10 may also include a harrow 26. As is generally understood, the harrow 26 may be configured to be pivotally coupled to the implement frame 16. The harrow 26 may include a plurality of ground engaging elements 28, such as tines or spikes, which are configured to level or otherwise flatten any windrows or ridges in the soil created by the cultivator 20. Specifically, the ground engaging elements 28 may be configured to be pulled through the soil as the implement 10 moves in the direction of travel 12. As will be described below, a force exerted on the ground engaging elements 28 may control the orientation of and/or the penetration depth of the ground engaging elements 28.

Although not shown, it should be appreciated that, in certain embodiments, the harrow 26 may include a plurality of harrow sections. In such embodiments, the harrow sections may be configured to be independently pivotable relative to the implement frame 16. Alternatively, the harrow sections may pivot in unison relative to the implement frame 16.

Moreover, in one embodiment, the implement 10 may optionally include a basket or rotary firming wheel 30. As is generally understood, the basket 30 may be configured to reduce the number of clods in the soil and/or firm the soil over which the implement 10 travels. As shown, the basket 30 may be configured to be pivotally coupled to the harrow 26. Alternatively, the basket 30 may be configured to be pivotally coupled to the implement frame 16 or any other suitable location of the implement 10.

It should be appreciated that the configuration of the implement 10 described above and shown in FIG. 1 is provided only to place the present subject matter in an exemplary field of use. Thus, it should be appreciated that the present subject matter may be readily adaptable to any manner of implement configuration.

Figure 2:
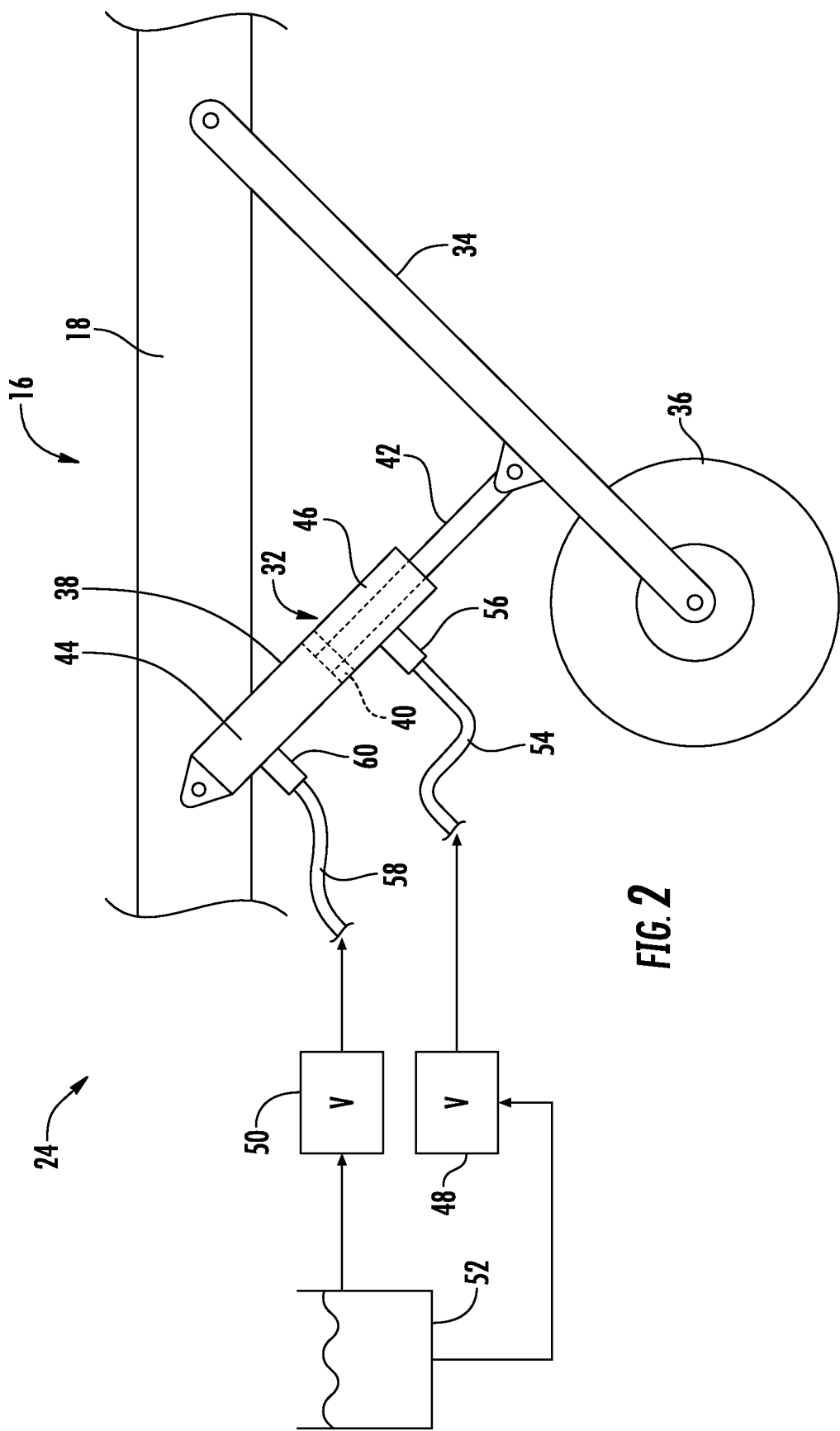
FIG. 2 illustrates a side view of one embodiment of a wheel assembly suitable for use with the agricultural implement shown in FIG. 1 in accordance with aspects of the present subject matter.

Referring now to FIG. 2, a side view of an exemplary embodiment of the wheel assembly 24 shown in FIG. 1 is illustrated in accordance with aspects of the present subject matter. Specifically, in several embodiments, the wheel assembly 24 may be configured to be moveable relative to the frame 16 to permit one or more associated wheel actuators 32 to adjust the position of the wheel assembly 24 relative to the frame 16. As will be described below, adjusting the position of the wheel assembly 24 relative to the frame 16 may raise and/or lower the implement 10 relative to the ground. For example, as shown, in one embodiment, one end of the wheel actuator 32 may be coupled to one of the frame members 18 of the frame 16. Similarly, an opposed end of the wheel actuator 32 may also be coupled to an arm 34 of the wheel assembly 24. As shown, the arm 34 may rotatably support one or more wheels 36 of the wheel assembly 24. However, a person of ordinary skill in the art would appreciate that the wheel assembly 24 may be adjustably coupled to the frame 16 in any suitable manner that permits the wheel actuator 32 to move the wheel assembly 24 relative to the frame 16.

It should be appreciated that the wheel actuator 32 may generally correspond to any suitable fluid-driven actuator known in the art, such as a hydraulic actuator and/or a pneumatic actuator. Thus, in several embodiments, the wheel actuator 32 may include both a cylinder 38 configured to house a piston 40 and a rod 42 coupled to the piston 40 that extends outwardly from the cylinder 38. Additionally, the wheel actuator 32 may include a piston-side chamber 44 and a rod-side chamber 46 defined within the cylinder 38. As is generally, understood, by regulating the pressure of the fluid supplied to one or both of the cylinder chambers, the actuation of the rod 42 may be controlled. As shown in FIG. 2, in the illustrated embodiment, the end of the rod 42 is coupled to the arm 34 while the cylinder 38 is coupled to the frame 16. However, in an alternative embodiment, the end of the rod 42 may be coupled to the frame 16 while the cylinder 38 is coupled to the arm 34.

In several embodiments, the implement 10 may also include suitable pressure regulating valves 48, 50 (PRV) (e.g., a solenoid-activated valve or a manually operated valve) configured to regulate a supply of fluid (e.g., hydraulic fluid or air from a suitable fluid source or tank 52) being supplied to the wheel actuator 32. As shown in FIG. 2, in one embodiment, the PRV 48 may be in fluid communication with the rod-side chamber 44 of the wheel actuator 32. In this respect, the wheel assembly 24 may include a fluid conduit 54, such as the illustrated hose, that fluidly couples the PRV 48 to a fitting 56 on the cylinder 38. As such, the PRV 48 may regulate the supply fluid to the rod-side chamber 44. Similarly, the PRV 50 may be in fluid communication with the piston-side chamber 46 of the wheel actuator 32. In this respect, the wheel assembly 24 may include a fluid conduit 58, such as the illustrated hose, that fluidly couples the PRV 50 to a fitting 60 on the cylinder 38. As such, the PRV 50 may regulate the supply fluid to the piston-side chamber 46. It should be appreciated that, in alternate embodiments, the wheel assembly 24 may include only one of the PRVs 48, 50.

Figure 3:
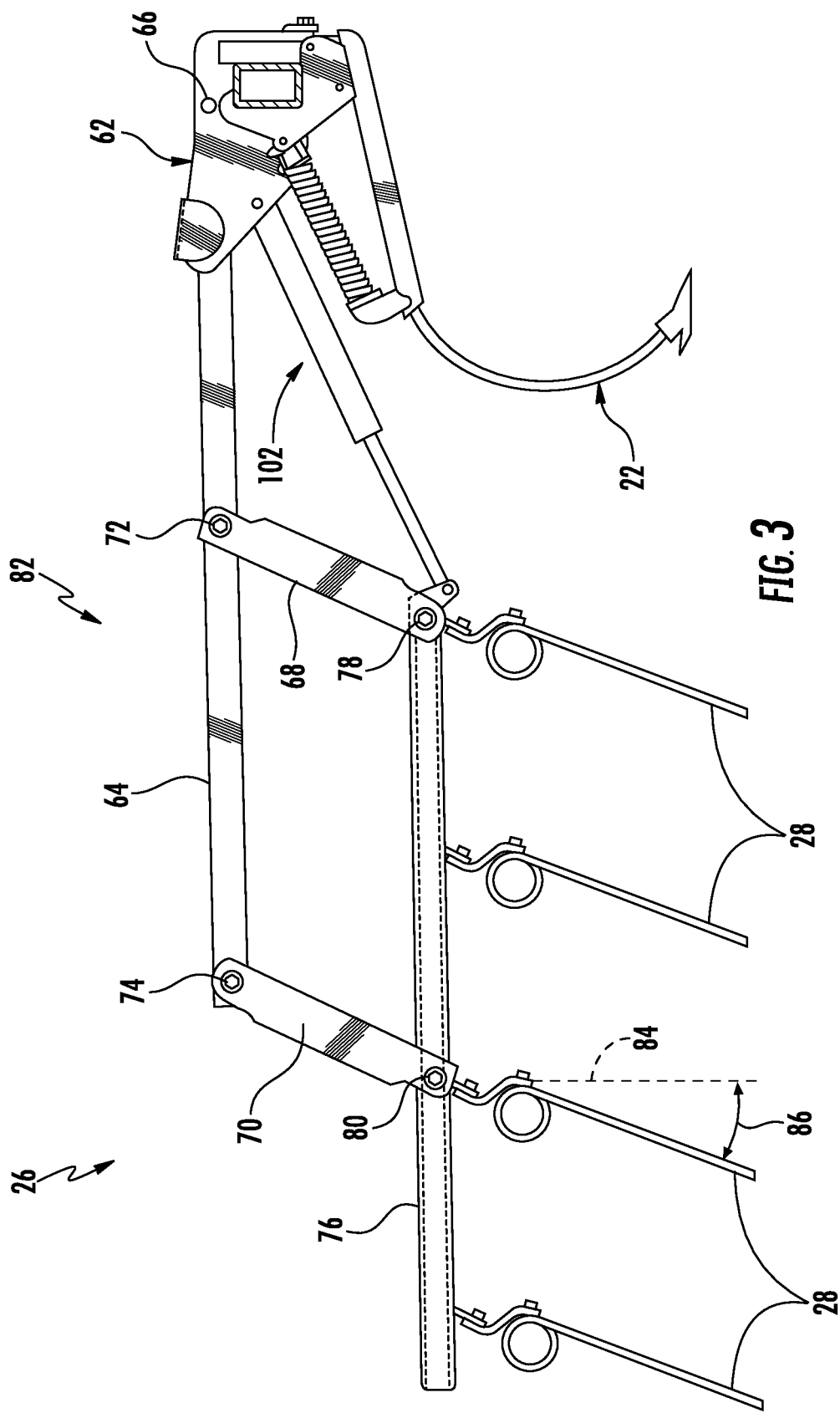
FIG. 3 illustrates a side view of one embodiment of a harrow suitable for use with the agricultural implement shown in FIG. 1 in accordance with aspects of the present subject matter.

Referring now to FIG. 3, a side view of an exemplary embodiment of the harrow 26 shown in FIG. 1 is illustrated in accordance with aspects of the present subject matter. As shown, the harrow 26 may include a base hitch member 62 rigidly coupled to one of the frame members 18 of the implement frame 16. An upper tow arm 64 may be pivotally coupled to the base hitch member 62 at a pivot joint 66. First and second linkage arms 68, 70 may be pivotally coupled to the upper tow arm 64 at pivot joints 72, 74. Additionally, a lower support arm 76 may be pivotally coupled to the first and second linkage arms 68, 70 at pivot joints 78, 80. The ground engaging elements 28, such as the illustrated tines, may be supported on the lower support arm 76. As is generally understand, the lower support arm 76 may be configured to support a plurality of rows of ground engaging elements 28.

As shown in FIG. 3, the upper tow arm 64, the first and second linkage arms 68, 70, and the lower support arm 76 may collectively form a four bar linkage 82, such as the illustrated parallelogram-shaped four-bar linkage. The four bar linkage 82 may be configured to allow the lower support arm 76 to move relative to the base hitch member 62 in the desired manner. More specifically, the upper tow arm 64 and the lower support arm 76 may generally be configured to be oriented in a parallel relationship. Similarly, the first and second linkage arms 68, 70 may generally be configured to be oriented in a parallel relationship. In this respect, the first and second linkage arms 68, 70 may allow the lower support arm 76 to pivot relative to the upper tow arm 64. As such, the lower support arm 76 may move toward and away from the base hitch member 62. Furthermore, the upper tow arm 64 and the lower support arm 76 may pivot relative to the base hitch member 62 to allow the ground engaging elements 28 to move out of the way of rocks or other impediments in the soil. In alternate embodiments, the four-bar linkage 82 may have any other suitable configuration that permits relative movement between the base hitch member 62 and the lower support arm 76.

Additionally, the harrow 26 may also include a tensioner assembly 102 coupled between the base hitch member 32 and the lower support arm 46. In general, the tensioner assembly 102 may be utilized to adjust the orientation of the ground engaging elements 28 of the harrow 26. For example, as will be described below, the tensioner assembly 102 may be configured to act on the ground engaging elements 28 in a manner such that a biasing force is applied on the ground engaging elements 28 as the ground engaging elements 28 contact the ground. This biasing force, in turn, may bias the ground engaging elements 28 toward a vertical orientation (e.g., as indicated by dashed line 84 in FIG. 3) relative to the ground. As such, the ground may prevent the biasing force from moving the ground engaging elements 28 to the vertical orientation 84 such that the ground engaging elements 28 are oriented at an angle (e.g., as indicated by arrow 86 in FIG. 3) relative to the vertical orientation 84 during operation of the harrow 26.

Figure 4:
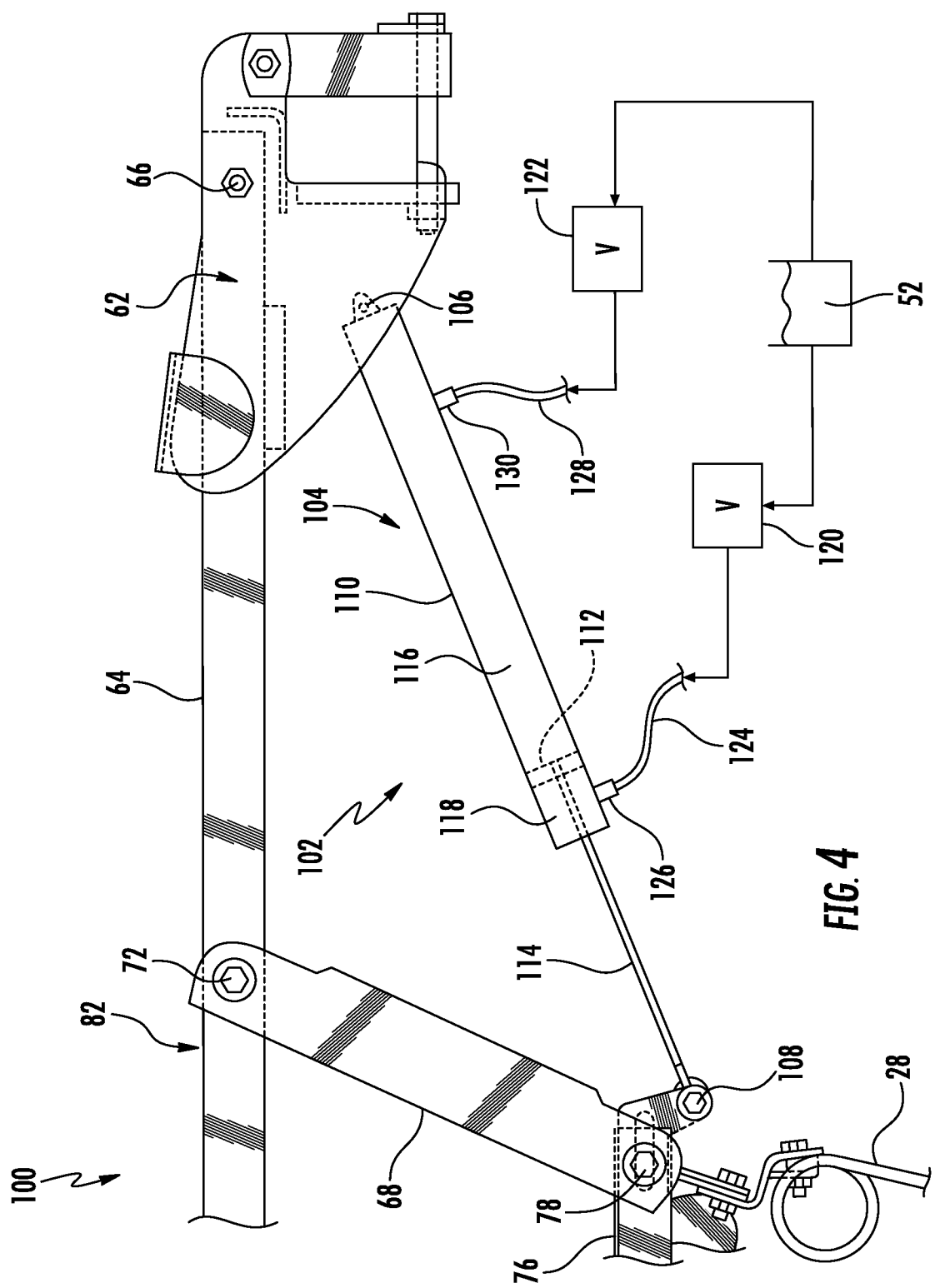
FIG. 4 illustrates a side view of one embodiment of a system for controlling an orientation of ground engaging elements of a harrow in accordance with aspects of the present subject matter, particularly illustrating the system including an actuator and associated valves for adjusting a bias force exerted on the ground engaging elements.

Referring now to FIG. 4, a side view of one embodiment of a system 100 for adjusting an orientation of the ground engaging elements of a harrow of an agricultural implement is illustrated in accordance with aspects of the present subject matter. In general, the system 100 will be described herein with reference to the agricultural implement 10, the wheel assembly 24, and the harrow 26 described above with reference to FIGS. 1-3. However, it should be appreciated by those of ordinary skill in the art that the disclosed system 100 may generally be utilized with harrows having any other suitable harrow configuration, wheel assemblies having any other suitable wheel assembly configuration, and/or implements having any other suitable implement configuration.

As shown, the system 100 may generally include a tensioner assembly 102 coupled between the base hitch member 62 and the lower support arm 76. In general, the tensioner assembly 102 may be configured to apply a force against the lower support arm 76 that biases the ground engaging elements 28 towards into the ground and a vertical orientation when the harrow 26 is disposed at its operating position, thereby maintaining a desired down force or pressure on the ground engaging elements 28. As shown in FIG. 4, the tensioner assembly 102 may include a fluid-driven actuator 104 coupled to the base hitch member 62 and the lower support arm 76 at pivot joints 106, 108, respectively. In particular, the pivot joints 106, 108 may allow relative pivotable movement between the actuator 104, the base hitch member 62, and the lower support arm 76. In alternative embodiments, the tensioner assembly 102 may include a linkage bar, a chain, a damper, or any other component coupled between the actuator 104 and the lower support arm 76 or the base hitch member 62.

It should be appreciated that the actuator 104 may generally correspond to any suitable fluid-driven actuator known in the art, such as a hydraulic actuator and/or a pneumatic actuator. Thus, in several embodiments, the actuator 104 may include both a cylinder 110 configured to house a piston 112 and a rod 114 coupled to the piston 112 that extends outwardly from the cylinder 110. Additionally, the actuator 104 may include a piston-side chamber 116 and a rod-side chamber 118 defined within the cylinder 110. As is generally, understood, by regulating the pressure of the fluid supplied to one or both of the cylinder chambers, the actuation of the rod 114 may be controlled. As shown in FIG. 4, in the illustrated embodiment, the end of the rod 114 is coupled to the lower support arm 76 at pivot joint 108 while the cylinder 110 is coupled to the base hitch member 32 at the opposed pivot joint 106. However, in an alternative embodiment, the end of the rod 114 may be coupled to the base hitch member 32 at pivot joint 106 while the cylinder is coupled to the lower support arm 46 at pivot joint 108.

In several embodiments, the system 100 may also include suitable pressure regulating valves 120, 122 (PRV) (e.g., a solenoid-activated valve or a manually operated valve) configured to regulate a supply of fluid (e.g., hydraulic fluid or air from the fluid source or tank 52) being supplied to the actuator 104. As shown in FIG. 4, in one embodiment, the PRV 120 may be in fluid communication with the rod-side chamber 118 of the actuator 104. In this respect, the system 100 may include a fluid conduit 124, such as the illustrated hose, that fluidly couples the PRV 120 to a fitting 126 on the cylinder 110. As such, the PRV 120 may regulate the supply fluid to the rod-side chamber 118. Similarly, the PRV 122 may be in fluid communication with the piston-side chamber 116 of the actuator 104. In this respect, the system 100 may include a fluid conduit 128, such as the illustrated hose, that fluidly couples the PRV 122 to a fitting 130 on the cylinder 110. As such, the PRV 122 may regulate the supply fluid to the piston-side chamber 116. It should be appreciated that, in alternate embodiments, the system 100 may only include one of the PRVs 120,122.

The actuator 104 may be configured to apply an actuator force against the lower support arm 76. In general, this actuator force results in or otherwise creates a biasing force that is applied to the ground engaging elements 28 to bias the ground engaging elements 28 toward a vertical orientation as the ground engaging elements 28 contact the ground. In several embodiments, the actuator force applied to the lower support arm 76 may be adjusted by varying the relative distance between the base hitch member 62 and the lower support arm 76, such as by regulating the pressure of the fluid supplied to and/or within the actuator 104. For instance, by increasing the fluid pressure supplied within the rod-side chamber 118 of the actuator 104 and/or decreasing the fluid pressure supplied within the piston-side chamber 116 of the actuator 104, the actuator rod 114 may be retracted in a manner that results in the lower support arm 76 pivoting toward the base hitch member 62, thereby increasing the resulting biasing force exerted on the ground engaging elements 28. Similarly, by decreasing the fluid pressure supplied within the rod-side chamber 118 of the actuator 104 and/or increasing the fluid pressure supplied within the piston-side chamber 116 of the actuator 104, the actuator rod 114 may be extended in a manner that results in the lower support arm 76 pivoting away from the base hitch member 62, thereby decreasing the resulting biasing force exerted on the ground engaging elements 28.

Figure 5:
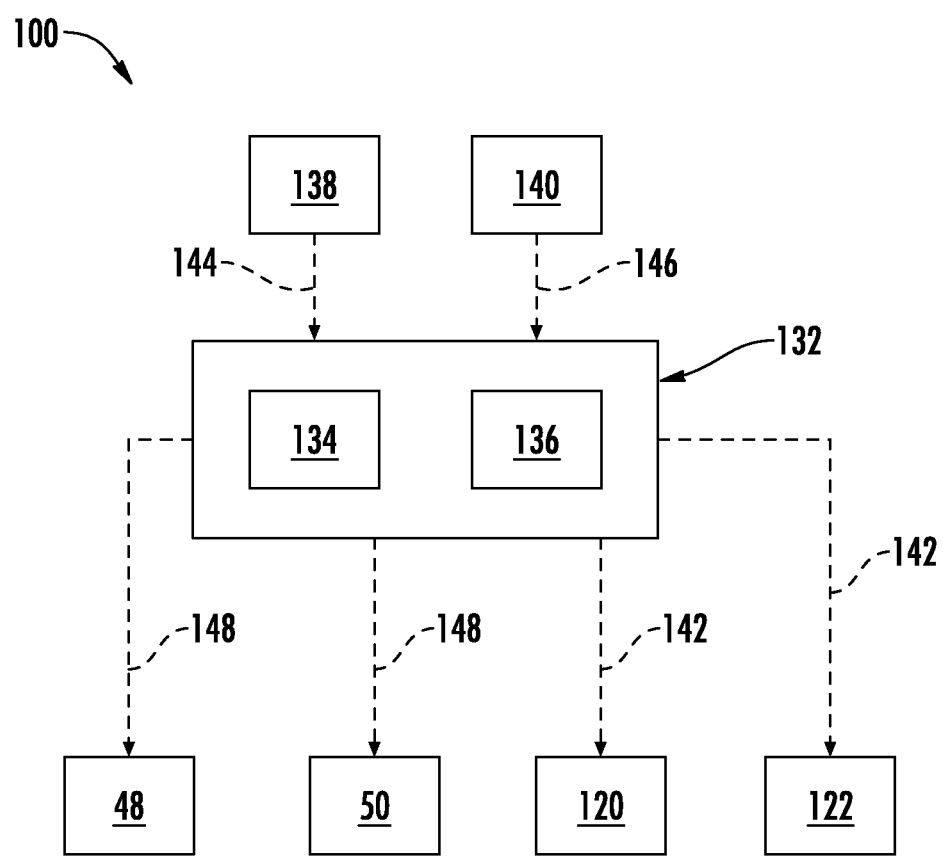
FIG. 5 illustrates a schematic view of the system for controlling an orientation of ground engaging elements of a harrow shown in FIG. 4, particularly illustrating the system including a controller for controlling an operation of the valves.

Referring now to FIG. 5, a schematic diagram of the system 100 described above with reference to FIG. 4 is illustrated in accordance with aspects of the present subject matter. As shown in FIG. 5, the system 100 may include a controller 132 configured to electronically control the operation of one or more of the disclosed system components. In general, the controller 132 may comprise any suitable processor-based device known in the art, such as a computing device or any suitable combination of computing devices. Thus, in several embodiments, the controller 132 may include one or more processor(s) 134 and associated memory device(s) 136 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 136 of the controller 132 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 136 may generally be configured to store suitable computer-readable instructions that, when implemented by the processor(s) 134, configure the controller 132 to perform various computer-implemented functions, such as one or more aspects of the method 200 described below with reference to FIG. 6. In addition, the controller 132 may also include various other suitable components, such as a communications circuit or module, one or more input/output channels, a data/control bus and/or the like.

It should be appreciated that the controller 132 may correspond to an existing controller of the work vehicle or the implement 10 or the controller 132 may correspond to a separate processing device. For instance, in one embodiment, the controller 132 may form all or part of a separate plug-in module that may be installed within the work vehicle or implement 10 to allow for the disclosed system and method to be implemented without requiring additional software to be uploaded onto existing control devices of the vehicle or implement 10.

Furthermore, in some embodiments, the system 100 may include a user interface 138 communicatively coupled to the controller 132. In general, the user interface may 138 be configured to receive an input from an operator of the implement 10. For example, the input may be an instruction to move or otherwise adjust the position of the implement 10 or a particular component of the implement 10 (e.g., the harrow 26) between an operating position and a raised or headlands position. As will be described below, when the harrow 26 is disposed at the operating position, the ground engaging elements 28 may engage the soil or otherwise be in contact with the ground. Similarly, when the harrow 26 is disposed at the raised position, the ground engaging elements 28 may be lifted out of the soil. It should be appreciated that the user interface 138 may include one or more input devices, such as touchscreens, keypads, touchpads, knobs, buttons, sliders, switches, mice, microphones, and/or the like.

Additionally, in one embodiment, the system 100 may also include a location sensor 140 communicatively coupled to the controller 132. In general, the location sensor may be configured to detect a parameter associated with a location of the implement 10, such as GPS coordinates. As will be described below, the detected location of the implement 10 may be used as an indicator that the implement 10 or a particular component of the implement 10, such as the harrow 26, should be moved to the operating position or the raised position, such as when it is detected that the implement 10 has reached the headlands. It should be appreciated that the location sensor 140 may correspond to a GPS receiver or any other suitable location sensor.

In several embodiments, the controller 132 may be configured to control the operation of the actuator 104 such that the actuator 104 applies the actuator force, such as a first actuator force, against the lower support arm 76 when the harrow 26 is disposed at the operating position relative to the ground. For example, the harrow 26 may generally be at the operating position when the implement 10 is traversing the field. As indicated above, when the harrow 26 is disposed at the operating position, the ground engaging elements 28 may be in contact with the ground. As such, the actuator force exerted on the lower support arm 76 by the actuator 104 may result in a biasing force being applied on the ground engaging elements 28 that biases the ground engaging elements 28 toward a vertical orientation. In this regard, the ground engaging elements 26 may level or otherwise flatten any windrows or ridges in the soil of the field created by the cultivator 20 when in the operating position. As is generally known, the bias force may maintain engagement between the ground engaging elements 28 and the soil as the implement 10 is towed through the field.

In one embodiment, the controller 132 may be configured to control the operation of the PRVs 120, 122 such that the actuator 104 applies the first actuator force against the lower support arm 76 when the harrow 26 is disposed at the operating position. Specifically, the controller 132 may be communicatively coupled to the PRVs 120, 122 via a wired or wireless connection to allow control signals (e.g., indicated by dashed lines 142 in FIG. 5) to be transmitted from the controller 132 to the PRVs 120, 122. For example, the control signals 142 may be configured to instruct the PRVs 120, 122 to open and/or close to supply fluid to the corresponding rod-side and/or the piston-side chambers 118, 116 of the actuator 104 at a fluid pressure so as to extend or retract the rod 114 in a manner such that the first actuator force is applied the lower support arm 76. However, it should be appreciated that, in alternative embodiments, the actuator 104 may be controlled in any other suitable manner such that the actuator 104 applies a desired actuator force on the lower support arm 76.

In accordance with aspects of the present subject matter, the controller 132 may also be configured to receive a first input indicative of an instruction to move the harrow 26 from the operating position to the raised position relative to the ground. For example, the harrow 26 may be moved from the operating position to the raised position when the implement 10 reaches an end of a row in the field, thereby permitting the implement 10 and the associated work vehicle to turn around and reverse its direction of travel in the field. As shown in FIG. 5, in one embodiment, the controller 132 may be communicatively coupled to the user interface 138 via a wired or wireless connection to allow user input signals (e.g., indicated by dashed line 144 in FIG. 5) to be transmitted from the user interface 138 to the controller 132. In general, the user input signals 144 may be an instruction from the operator of the implement 10 to raise the harrow 26 from the operating position to the raised position. For instance, the operator of the implement 10 may provide such an instruction to the user interface 138 when the implement 10 reaches the end of the field or another headlands within the field.

In another embodiment, the controller 132 may be configured to receive the first input from the location sensor 140. Specifically, the controller 132 may be communicatively coupled to the location sensor 140 via a wired or wireless connection to allow location signals (e.g., indicated by dashed line 146 in FIG. 5) to be transmitted from the location sensor 140 to the controller 132. In general, the location signals 146 may be indicative of a location of the implement 10 (e.g., global positioning system coordinates). In such embodiments, the controller 132 may be configured to determine the position of the implement 10 within the field based on those location signals 146. For example, the controller 132 may be configured to compare this determined location to a map stored within its memory 136 so as to determine the location of the implement 10 within the field. When the controller 132 determines that the implement 10 is proximate to a headlands, the controller 132 may be configured to control the operation of the wheel actuator 32 such that the implement 10 is moved to the raised position as will be described below. However, it should be appreciated that, in alternative embodiments, the controller 132 may be configured to receive any other suitable input indicative of an instruction to move the harrow 26 from the operating position to the raised position from any other suitable source.

After receiving the first input, the controller 132 may be configured to control the operation of the actuator 104 such that the actuator force applied against the lower support arm 76 is adjusted in a manner that reduces the biasing force being applied on the ground engaging elements 28. Specifically, as shown in FIGS. 4 and 5, in several embodiments, the controller 132 may be configured to control the operation of the actuator 104 such that the actuator force applied against the lower support arm 76 is decreased so as to reduce the biasing force being applied on the ground engaging elements 28. As such, the actuator 104 may be configured to apply a second actuator force on the lower support arm 76 after receipt of the first input, with the second actuator force being less than the initial actuator force applied to the lower support arm 76 when attempting to bias the ground engaging elements 28 towards the vertical orientation so as to maintain a desired down force or pressure between the ground engaging elements 28 and the ground. For example, as mentioned above, the actuator 104 may control the actuator force applied to the lower support arm 76. In such embodiments, the controller 132 may be configured to transmit control signals 142 to the PRVs 120, 122 instructing the PRVs 120, 122 to open and/or close in a manner that causes the rod 114 to extend relative to the cylinder 110. For example, the control signals 142 may instruct the PRV 120 to decrease the pressure of fluid being supplied to the rod-side chamber 118 and/or instruct the PRV 122 to increase the pressure of fluid being supplied to the piston-side chamber 116. Extension of the rod 114 may reduce the biasing force being applied on the ground engaging elements 28.

Moreover, the controller 132 may be configured to initiate movement of the harrow 26 from the operating position to the raised position to raise the ground engaging elements 28 above the ground after reducing the biasing force applied against the ground engaging elements 28. In general, the controller 132 may be configured to initiate movement of the harrow 26 to the raised position after controlling the actuator 104 to reduce the biasing force applied to the ground engaging elements 28. Specifically, as shown in FIGS. 2 and 5, in one embodiment, the controller 132 may be configured to control the operation of the wheel actuator 32 such that the implement 10 is lifted relative to the ground from the operating position to the raised position. For example, the controller 132 may be communicatively coupled to the PRVs 48, 50 via a wired or wireless connection to allow control signals (e.g., indicated by dashed lines 148 in FIG. 5) to be transmitted from the controller 132 to the PRVs 48, 50. As such, the control signals 148 may be configured to instruct the PRVs 48, 50 to open and/or close to supply fluid to the corresponding rod-side and/or the piston-side chambers 46, 44 of the wheel actuator 32 at a fluid pressure such that the rod 42 extends, thereby lifting the implement 10 relative to the ground. However, it should be appreciated that, in alternative embodiments, the harrow 26 may be moved from the operating position to the raised position in any other suitable manner.

Furthermore, it should be appreciated that the reduced biasing force applied to the ground engaging elements 28 may maintain the ground engaging elements 28 at a non-vertical orientation (e.g., the angle 86) when the harrow 26 is disposed at the raised position. Specifically, by reducing the biasing force, the ground engaging implements 28 may not be under a sufficient load such the ground engaging elements 28 pivot to the vertical position 84 when the ground engaging elements 28 are lifted out of the soil. As such, the ground engaging elements 28 may be able to reengage the ground when the harrow 26 is lowered back into the operating position.

Additionally, the controller 132 may also be configured to receive a second input indicative of an instruction to move the harrow 26 from the raised position to the operating position relative to the ground. For example, the harrow 26 may be moved from the raised position to the operating position when the implement 10 is at beginning of a row in the field, such as after the implement 10 and the associated work vehicle have turned around and reversed their direction of travel. As described above, the controller 132 may be configured to receive the second input via the user input signals 144 transmitted by the user interface 138 and/or the location signals 146 transmitted from the location sensor 140.

After receiving the second input, the controller 132 may be configured to initiate movement of the harrow 26 from the raised position to the operating position to lower the ground engaging elements 28 back into contact with the ground. Specifically, as shown in FIGS. 2 and 5, in one embodiment, the controller 132 may be configured to control the operation of the wheel actuator 32 such that the implement 10 is lowered relative to the ground from the raised position to the operating position. For example, as described above, the controller 132 may be configured to transmit the control signals 148 to the PRVs 48, 50. In this regard, the control signals 148 may be configured to instruct the PRVs 48, 50 to open and/or close to supply fluid to the corresponding rod-side and/or the piston-side chambers 46, 44 of the wheel actuator 32 at a fluid pressure such that the rod 42 retracts, thereby lowering the implement 10 relative to the ground. However, it should be appreciated that, in alternative embodiments, the harrow 26 may be moved from the raised position to the operating position in any other suitable manner.

Furthermore, after the harrow 26 is moved from the raised position to the operating position, the controller 132 may be configured to control the operation of the actuator 104 such that the actuator force applied against the lower support arm 76 is adjusted in a manner that increases the biasing force being applied on the ground engaging elements 28. Specifically, in several embodiments, the controller 132 may be configured to control the operation of the actuator 104 such that the actuator force applied against the lower support arm 76 is increased, such as back to the first actuator force, so as to increase the biasing force being applied on the ground engaging elements 28. For example, as shown in FIGS. 4 and 5, the controller 132 may be configured to transmit the control signals 142 to the PRVs 120, 122 instructing the PRVs 120, 122 to open and/or close in a manner that causes the rod 114 to retract relative to the cylinder 110. In this regard, the control signals 142 may instruct the PRV 120 to increase the pressure of fluid being supplied to the rod-side chamber 118 and/or instruct the PRV 122 to decrease the pressure of fluid being supplied to the piston-side chamber 116. Retraction of the rod 114 may increase the biasing force being applied on the ground engaging elements 28.

Figure 6:
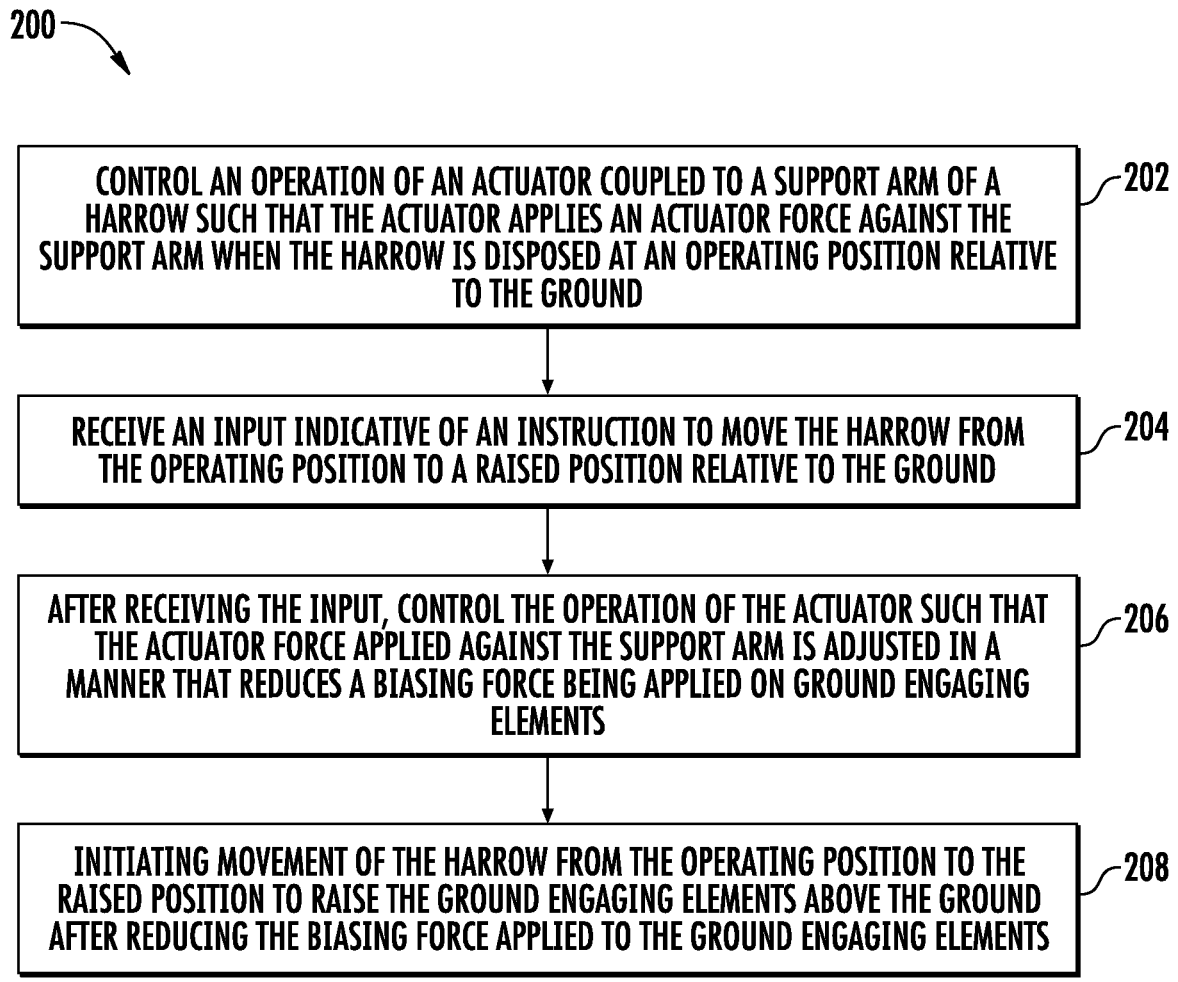
FIG. 6 illustrates a flow chart of one embodiment of a method for controlling an orientation of ground engaging elements of a harrow in accordance with aspects of the present subject matter.

Referring now to FIG. 6, a flow diagram of one embodiment of a method 200 for adjusting an orientation of the ground engaging elements of a harrow of an agricultural implement is illustrated in accordance with aspects of the present subject matter. In general, the method 200 will be described herein with reference to the implement 10, the harrow 26, and the system 100 described above with reference to FIGS. 1-5. However, it should be appreciated by those of ordinary skill in the art that the disclosed method 200 may generally be utilized to adjust an orientation of the ground engaging elements on any agricultural implement having any suitable implement configuration and/or on any harrow having any suitable harrow configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include controlling, with a computing device, an operation of an actuator coupled to a support arm of a harrow such that the actuator applies an actuator force against the support arm when the harrow is disposed at an operating position relative to the ground. For instance, as described above, the controller 132 may be configured to control the operation of the actuator 104 such that the actuator 104 applies the first actuator force against the lower support arm 76 when the harrow 28 is disposed at the operating position.

Additionally, at (204), the method 200 may include receiving, with the computing device, a first input indicative of an instruction to move the harrow from the operating position to a raised position relative to the ground. For instance, as described above, the controller 132 may be configured to receive the user input signals 144 from the user interface 138 and/or the location signals 146 from the location sensor 140.

Moreover, as shown in FIG. 6, at (206), the method 200 may include controlling, with the computing device, the operation of the actuator such that the actuator force applied against the support arm is adjusted in a manner that reduces the biasing force being applied on the ground engaging elements. For instance, as described above, the controller 132 may be configured to control the operation of the actuator 104 such that the actuator force applied against the lower support arm 76 is adjusted in a manner that reduces the biasing force being applied on the ground engaging elements 28.

Furthermore, at (208), the method may include initiating, with the computing device, movement of the harrow from the operating position to the raised position to raise the ground engaging elements above the ground after reducing the biasing force applied to the ground engaging elements. For instance, as described above, the controller 132 may be configured to initiate movement of the harrow 26 from the operating position to the raised position to raise the ground engaging elements 28 above the ground, such as by controlling the operation of the wheel actuator 32, after reducing the biasing force applied against the ground engaging elements 28.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method for controlling an orientation of ground engaging elements of a harrow of an agricultural implement when adjusting the position of the harrow relative to the ground, the harrow comprising a support arm configured to support the ground engaging elements relative to the ground, the method comprising:
   controlling, with a computing device, an operation of an actuator coupled to the support arm such that the actuator applies an actuator force against the support arm when the harrow is disposed at an operating position relative to the ground, the actuator force resulting in a biasing force being applied on the ground engaging elements that biases the ground engaging elements toward a vertical orientation as the ground engaging elements contact the ground;
   receiving, with the computing device, a first input indicative of an instruction to move the harrow from the operating position to a raised position relative to the ground;
   after receiving the first input, controlling, with the computing device, the operation of the actuator such that the actuator force applied against the support arm is adjusted in a manner that reduces the biasing force being applied on the ground engaging elements; and
   after the biasing force is reduced, initiating, with the computing device, movement of the harrow from the operating position to the raised position to raise the ground engaging elements above the ground after reducing the biasing force being applied on the ground engaging elements.

2. The method of claim 1, wherein controlling the operation of the actuator such that the actuator force is reduced comprises controlling, with the computing device, the operation of actuator such that a fluid pressure within the actuator is reduced before the harrow is moved from the operating position to the raised position.

3. The method of claim 1, wherein the actuator is a fluid-driven actuator, the method further comprising:
   controlling, with the computing device, an operation of a valve configured to regulate a supply of fluid being supplied to the fluid-driven actuator such that the actuator applies a first actuator force against the support arm when the harrow is in the operating position; and
   controlling, with the computing device, the operation of the valve such that the actuator applies a second actuator force against the support arm after receiving the first input and prior to moving the harrow to the raised position, the second actuator force being less than the first actuator force.

4. The method of claim 1, further comprising:
   receiving, with the computing device, a second input indicative of an instruction to move the harrow from the raised position back to the operating position; and
   controlling, with the computing device, the operation of the actuator such that actuator force is increased after receiving the second input.

5. The method of claim 4, wherein controlling the operation of the actuator such that the actuator force is increased after receiving the second input comprises controlling, with the computing device, the operation of the actuator such that the actuator force is increased after the harrow is moved from the raised position to the operating position and the ground engaging elements are in contact with the ground.

6. The method of claim 1, further comprising:
   receiving, with the computing device, the first input from a user input device.

7. The method of claim 1, further comprising:
   receiving, with the computing device, the first input from a GPS sensor.

8. The method of claim 1, wherein controlling the operation of the actuator such that the actuator force applied against the support arm is adjusted comprises reducing the actuator force applied against the support arm such that the ground engaging elements are maintained at a non-vertical orientation when the harrow is moved from the operating position to the raised position.

9. A system for controlling an orientation of ground engaging elements of a harrow of an agricultural implement when adjusting the position of the harrow relative to the ground, the system comprising:
   a support arm;
   a plurality of ground engaging elements supported on the support arm;
   an actuator coupled to the support arm; and
   a controller configured to:
      control an operation of the actuator such that the actuator applies an actuator force against the support arm when the harrow is disposed at an operating position relative to the ground, the actuator force resulting in a biasing force being applied on the ground engaging elements that biases the ground engaging elements toward a vertical orientation as the ground engaging elements contact the ground;

receive a first input indicative of an instruction to move the harrow from the operating position to a raised position relative to the ground;

after receiving the first input, control the operation of the actuator such that the actuator force applied against the support arm is adjusted in a manner that reduces the biasing force being applied on the ground engaging elements; and after the biasing force is reduced, initiate movement of the harrow from the operating position to the raised position to raise the ground engaging elements above the ground after reducing the biasing force being applied on the ground engaging elements.

10. The system of claim 9, wherein the controller is configured to control the operation of actuator such that a fluid pressure within the actuator is reduced before the harrow is moved from the operating position to the raised position.

11. The system of claim 9, wherein the actuator is a fluid-driven actuator, the controller being further configured to:

control an operation of a valve configured to regulate a supply of fluid being supplied to the fluid-driven actuator such that the actuator applies a first actuator force against the support arm when the harrow is in the operating position; and control the operation of the valve such that the actuator applies a second actuator force against the support arm after receiving the first input and prior to moving the harrow to the raised position, the second actuator force being less than the first actuator force.

12. The system of claim 9, wherein the controller is further configured to:

receive a second input indicative of an instruction to move the harrow from the raised position back to the operating position; and control the operation of the actuator such that actuator force is increased after receiving the second input.

13. The system of claim 12, wherein the controller is configured to control the operation of the actuator such that the actuator force is increased after the harrow is moved from the raised position to the operating position and the ground engaging elements are in contact with the ground.

14. The system of claim 9, wherein the controller is further configured to receive the first input from a user input device.

15. The system of claim 9 wherein the controller is further configured to receive the first input from a GPS sensor.

16. The system of claim 9, wherein the controller is configured to control the operation of the actuator such that the actuator force applied against the support arm is adjusted by reducing the actuator force applied against the support arm such that the ground engaging elements are maintained at a non-vertical orientation when the harrow is moved from the operating position to the raised position.

17. The system of claim 9, further comprising:

a base hitch member;

an upper tow arm pivotally coupled to the base hitch member; and first and second linkage arms pivotally coupled between the upper tow arm and the support arm so as to form a four bar linkage, wherein the actuator is coupled between the base hitch member and the support arm.

18. The system of claim 9, wherein the plurality of ground engaging elements comprises a plurality of tines.

19. A method for controlling an orientation of ground engaging elements of a harrow of an agricultural implement when adjusting the position of the harrow relative to the ground, the harrow comprising a support arm configured to support the ground engaging elements relative to the ground, the method comprising:

controlling, with a computing device, an operation of a valve configured to regulate a supply of fluid being supplied to a fluid-driven actuator coupled to the support arm such that the fluid-driven actuator applies a first actuator force against the support arm when the harrow is disposed at an operating position relative to the ground, the first actuator force resulting in a biasing force being applied on the ground engaging elements that biases the ground engaging elements toward a vertical orientation as the ground engaging elements contact the ground;

receiving, with the computing device, a first input indicative of an instruction to move the harrow from the operating position to a raised position relative to the ground;

after receiving the first input and prior to moving the harrow to the raised position, controlling, with the computing device, the operation of the valve such that the fluid-driven actuator applies a second actuator force against the support arm to reduce the biasing force being applied on the ground engaging elements, the second actuator force being less than the first actuator force; and initiating, with the computing device, movement of the harrow from the operating position to the raised position to raise the ground engaging elements above the ground after reducing the biasing force being applied on the ground engaging elements.

20. The method of claim 19, further comprising:

receiving, with the computing device, a second input indicative of an instruction to move the harrow from the raised position back to the operating position; and controlling, with the computing device, the operation of the actuator such that actuator force is increased after receiving the second input.

* * * * *